United States Patent
Gauthier et al.

(10) Patent No.: US 8,949,891 B2
(45) Date of Patent: Feb. 3, 2015

(54) CUSTOMIZED ZAPPING

(75) Inventors: Aurelie Gauthier, Issy les Moulineaux (FR); Vincent Sattler, Paris (FR); Laurent Chauvier, Villevallier (FR); Bijal Shah, Slough (GB); Stephen Hoiman Lee, Egham (GB); Alex Ruelle, Colombes (FR)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 14/115,726

(22) PCT Filed: May 9, 2012

(86) PCT No.: PCT/IB2012/052318
§ 371 (c)(1),
(2), (4) Date: Dec. 26, 2013

(87) PCT Pub. No.: WO2012/153284
PCT Pub. Date: Nov. 15, 2012

(65) Prior Publication Data
US 2014/0109134 A1    Apr. 17, 2014

Related U.S. Application Data

(60) Provisional application No. 61/518,702, filed on May 10, 2011.

(51) Int. Cl.
*H04N 5/445* (2011.01)
*H04N 21/462* (2011.01)
(Continued)

(52) U.S. Cl.
CPC ....... *H04N 21/4622* (2013.01); *H04N 21/4384* (2013.01); *H04N 21/42209* (2013.01);
(Continued)

(58) Field of Classification Search
CPC ............... H04N 21/4384; H04N 21/42209; H04N 21/4383
USPC ................................. 725/38, 40, 47
See application file for complete search history.

(56) References Cited

U.S. PATENT DOCUMENTS

| 5,786,845 A | 7/1998 | Tsuria |
| 5,907,321 A * | 5/1999 | Grossman et al. ............. 725/32 |

(Continued)

FOREIGN PATENT DOCUMENTS

| EP | 0 594 350 A1 | 4/1994 |
| EP | 1 657 918 A1 | 5/2006 |

(Continued)

OTHER PUBLICATIONS

Oct. 2 2012 Transmittal of International Search Report and Written Opinion of the International Searching Authority for PCT/IB2012/052318.

(Continued)

*Primary Examiner* — Pankaj Kumar
*Assistant Examiner* — Sahar Baig
(74) *Attorney, Agent, or Firm* — Husch Blackwell LLP

(57) ABSTRACT

A method and apparatus is described to display a customized video sequence during a channel change interval. The method includes displaying a first channel; receiving a channel change request from a user requesting a second channel for display; displaying a video sequence during the channel change interval; and displaying a second channel; characterized in that the displaying of the video sequence during the channel change interval further comprises displaying a black screen with no audio and no video for a short duration; playing out a first portion of a customized video sequence relevant to the second channel entirely; and playing out a second portion of the customized video sequence relevant to the second channel until the second channel is ready to be displayed.

20 Claims, 7 Drawing Sheets

(51) Int. Cl.
*H04N 21/438* (2011.01)
*H04N 21/422* (2011.01)
*G06Q 30/00* (2012.01)
*H04N 5/50* (2006.01)
*H04N 21/81* (2011.01)
*H04N 21/442* (2011.01)
*H04N 21/45* (2011.01)
*H04N 21/482* (2011.01)
*H04N 21/84* (2011.01)
*H04N 21/845* (2011.01)
*H04N 21/41* (2011.01)
*H04N 21/4147* (2011.01)

(52) U.S. Cl.
CPC ............ *G06Q30/00* (2013.01); *H04N 5/50* (2013.01); *H04N 21/812* (2013.01); *H04N 21/4383* (2013.01); *H04N 21/44222* (2013.01); *H04N 21/4532* (2013.01); *H04N 21/4828* (2013.01); *H04N 21/84* (2013.01); *H04N 21/8455* (2013.01); *H04N 21/41* (2013.01); *H04N 21/4147* (2013.01)
USPC .............................. 725/38; 725/40; 725/47

(56) References Cited

U.S. PATENT DOCUMENTS

| | | | |
|---|---|---|---|
| 6,304,852 | B1 | 10/2001 | Loncteaux |
| 6,473,137 | B1 | 10/2002 | Godwin et al. |
| 6,593,973 | B1 | 7/2003 | Sullivan et al. |
| 6,963,611 | B1 * | 11/2005 | Doyen et al. ............ 375/240.25 |
| 7,237,251 | B1 | 6/2007 | Oz et al. |
| 8,683,013 | B2 * | 3/2014 | Major et al. ................. 709/219 |
| 8,782,725 | B2 * | 7/2014 | Song et al. .................... 725/110 |
| 2001/0013123 | A1 * | 8/2001 | Freeman et al. ................ 725/34 |
| 2003/0030752 | A1 * | 2/2003 | Begeja et al. ................. 348/563 |
| 2004/0189879 | A1 | 9/2004 | Read |
| 2004/0261127 | A1 * | 12/2004 | Freeman et al. ............... 725/135 |
| 2007/0033623 | A1 * | 2/2007 | Fredrickson et al. ........... 725/88 |
| 2007/0146551 | A1 | 6/2007 | O'Neil |
| 2007/0188665 | A1 * | 8/2007 | Watson et al. ................ 348/731 |
| 2008/0044161 | A1 | 2/2008 | White et al. |
| 2008/0282285 | A1 | 11/2008 | Thomas et al. |
| 2009/0010324 | A1 * | 1/2009 | Yamamoto ............... 375/240.01 |
| 2009/0220011 | A1 | 9/2009 | Kursawe et al. |
| 2010/0199308 | A1 | 8/2010 | Hall et al. |
| 2012/0011545 | A1 * | 1/2012 | Doets et al. .................... 725/38 |
| 2014/0053208 | A1 * | 2/2014 | Sirpal et al. .................... 725/52 |
| 2014/0157311 | A1 * | 6/2014 | Rodriguez et al. ............. 725/38 |

FOREIGN PATENT DOCUMENTS

| | | |
|---|---|---|
| GB | 2 302 635 A | 1/1997 |
| WO | WO 01/30073 A1 | 4/2001 |
| WO | WO 2010/112591 A1 | 10/2010 |

OTHER PUBLICATIONS

B.E. Godana et al., "Impact of Advertisements During Channel Zapping in Quality of Experience," *2009 Fifth International Conference on Networking and Services*, pp. 249-254 (IEEE 2009).

Sep. 4, 2014 Office Communication in connection with EP 12 724 732.8.

* cited by examiner

CUSTOMIZED ZAPPING

The present application is a U.S. national stage of international application PCT/IB2012/052318, filed on 9 May 2012 and published in the English language with publication number WO 2012/153284 A1 on 15 Nov. 2012, which claims the benefit of the filing date of U.S. Ser. No. 61/518,702, filed 10 May 2011.

FIELD OF THE INVENTION

The present invention relates to the display of customized video sequences during channel change.

BACKGROUND OF THE INVENTION

Zapping from a channel to another channel usually takes some time, typically between 1.5 and 2.5 seconds in a broadcast television environment. This time is typically made up of
Identifying technical setting (transport stream locations, frequency, etc.);
Tuning to the new frequency (if required);
Starting descrambling (if required);
Acquiring the first key frame (i-frame) in the stream to start decoding;
Controlling parental criteria for the program; etc.

On most broadcast television platforms, the zapping sequence is experienced by the user as a "black screen", i.e. no video and no audio. Sometimes the user is presented with a zap banner showing the name of the next channel and information about the current program of this next channel.

Some alternative user experiences have previously been tested or deployed on some broadcast platforms or in laboratories where the black screen is replaced by a colored screen, or pictures with or without animations, or a video of the channel's logo.

In parallel a lot of effort has previously been deployed to reduce the channel change time, e.g. by reordering the different steps of the process, prioritizing tasks, using multi-picture-in-picture, etc.

There have also been some efforts made to avoid the "black screen" in general (not only for zapping) by filling the time gap with appropriate video. For example, United States patent publication US 2008/0044161 describes how to switch smoothly between compressed videos by using a pre-recorded uncompressed copy of one of the videos; United States patent publication US 2008/0282285 describes how to play alternative content while the user is pausing the current media in review buffer; and United Kingdom patent GB 2 302 635 describes how to play a special one-to-all video while the user is controlling one-to-one content with idle time or non-transmission time in a Video-On-Demand (VOD) infrastructure

SUMMARY OF THE INVENTION

There is thus provided in accordance with an embodiment of the present invention a method for displaying a customized video sequence during a channel change interval, the method including displaying a first channel; receiving a channel change request from a user requesting a second channel for display; displaying a video sequence during the channel change interval; and displaying a second channel; wherein, the displaying of a video sequence during the channel change interval further includes displaying a black screen with no audio and no video for a short duration; playing out a first portion of a customized video sequence relevant to the second channel entirely; and playing out a second portion of the customized video sequence relevant to the second channel until the second channel is ready to be displayed.

Further, in accordance with an embodiment of the present invention the playing out the second portion is interrupted when the second channel is ready to be displayed.

Still further, in accordance with an embodiment of the present invention, the playing out the second portion is performed again when the end of the second portion is reached and until the second channel is ready to be displayed.

Additionally, in accordance with an embodiment of the present invention, the end points of the first and second portions are signaled in metadata provided by television operators.

Further, in accordance with an embodiment of the present invention, the method further includes storing a plurality of customized video sequences, the plurality of customized video sequences being relevant to a plurality of channels; and identifying a customized video sequence relevant to a second channel requested by a user from the plurality of customized video sequences, the relevant customized video sequence being displayed as the video sequence.

Still further, in accordance with an embodiment of the present invention, storing a plurality of customized video sequences includes storing the customized video sequences in a single video file.

Additionally, in accordance with an embodiment of the present invention, storing the customized video sequences in a single video file further includes opening and placing the video file in a pause mode until a customized video sequence relevant to the second channel is identified for being played out.

Further, in accordance with an embodiment of the present invention, storing a plurality of customized video sequences includes storing the customized video sequences in a plurality of video files.

Still further, in accordance with an embodiment of the present invention, storing the customized video sequences in a plurality of video files includes storing a set of customized video sequences relevant to one channel in a separate video file.

Additionally, in accordance with an embodiment of the present invention, storing the set of customized video sequences relevant to one channel in a separate file includes storing customized video sequences of channels adjacent to the one channel.

Further, in accordance with an embodiment of the present invention, storing the customized video sequences in a plurality of video files includes storing a set of customized video sequences relevant to a specific group of channels in a separate video file.

Still further, in accordance with an embodiment of the present invention, storing the set of customized video sequences relevant to a specific group of channels in a separate video file includes storing customized video sequences relevant to one channel along with customized video sequences of channels having a same two first digits as the one channel.

Additionally, in accordance with an embodiment of the present invention, storing the set of customized video sequences relevant to a specific group of channels in a separate video file includes storing customized video sequences of channels included in a specific subscription pack.

Further, in accordance in an embodiment of the present invention, storing the set of customized video sequences relevant to a specific group of channels in a separate video file includes storing customized video sequences of channels marked as favorite channels by a user.

Still further, in accordance with an embodiment of the present invention, storing the set of customized video sequences relevant to a specific group of channels in a separate video file includes storing customized video sequences of channels obtained as results of a search performed by a user.

Additionally, in accordance with an embodiment of the present invention, the identifying the customized video sequence relevant to a second channel requested by a user includes using metadata provided by television operators.

Further, in accordance with an embodiment of the present invention, the method further includes processing a plurality of customized video sequences to create a plurality of new customized video sequences, the plurality of new customized video sequences being relevant to a plurality of channels.

Still further, in accordance with an embodiment of the present invention, the processing the plurality of customized video sequences includes retrieving relevant frames for the customized video sequences from external sources.

Additionally, in accordance with an embodiment of the present invention, the processing the plurality of customized video sequences includes extracting relevant frames from the customized video sequences.

Further, in accordance with an embodiment of the present invention, extracting relevant frames from the customized video sequences includes extracting i-frames from the customized video sequences.

Still further, in accordance with an embodiment of the present invention, the method further includes playing out the processed customized video sequences as graphic sequences using an i-frame decoder while decoding a second channel requested by a user.

Additionally, in accordance with an embodiment of the present invention, the processing the plurality of customized video sequences to create the plurality of new customized video sequences includes creating new frames, each of the new frames containing a mosaic of relevant frames extracted from the customized video sequences.

Further, in accordance with an embodiment of the present invention, the method further includes decoding and storing a new customized video sequence; playing out a first portion of the new customized video sequence upon decoding of the first portion; playing out a second portion of the new customized video sequence when the first portion has been played entirely and until a second channel requested by a user is ready to be displayed, wherein the playing out the second portion is achieved using the stored new customized video sequence.

Still further, in accordance with an embodiment of the present invention, the playing out the first and second portions of the new customized video sequence includes upscaling a relevant frame of the mosaic of relevant frames for display in full screen.

There is also provided in accordance with a further embodiment of the present invention an apparatus for displaying a customized video sequence during a channel change interval, the device including: means for displaying a first channel, a video sequence during the channel change interval and a second channel; means for receiving a channel change request from a user requesting a second channel for display; wherein the means for displaying a video sequence during the channel change interval is further for displaying a black screen with no audio and no video for a short duration; for playing out a first portion of a customized video sequence relevant to the second channel entirely; and for playing out a second portion of the customized video sequence relevant to the second channel until the second channel is ready to be displayed.

There is also provided with a further embodiment of the present invention a receiving device operable to display a customized video sequence during a channel change interval, the device including: a display device operable to display a first channel, a video sequence during the channel change interval and a second channel; a receiver operable to receive a channel change request from a user requesting a second channel for display; wherein the display device operable to display a video sequence during the channel change interval is further operable to display a black screen with no audio and no video for a short duration; to play out a first portion of a customized video sequence relevant to the second channel entirely; and to play out a second portion of the customized video sequence relevant to the second channel until the second channel is ready to be displayed.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Video Narration

Figure 2:
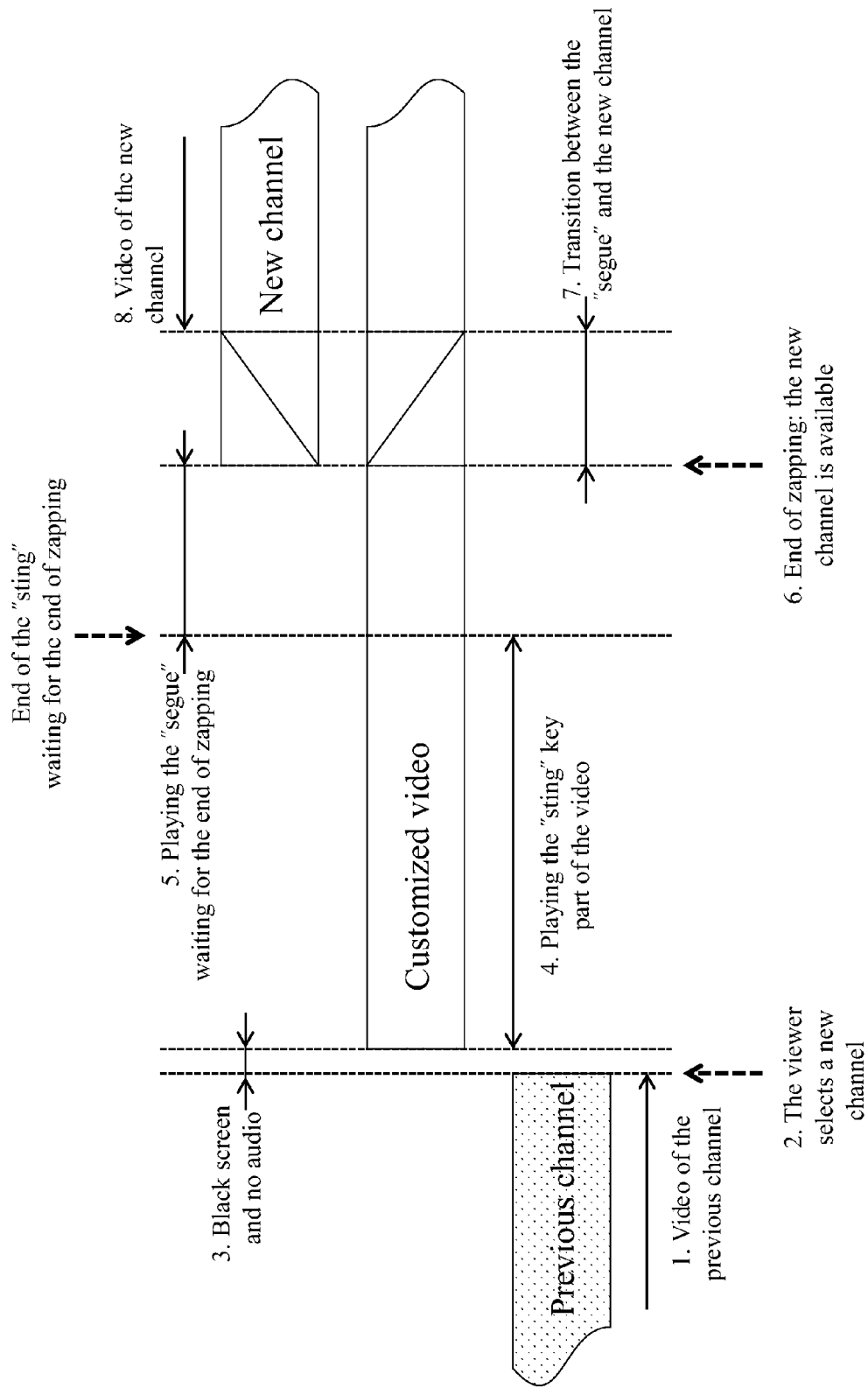
FIG. 2 illustrates a method of playing a customized video sequence during a channel change according to embodiments of the present invention.

Referring now to FIG. 2, when a viewer decides to zap to another channel (i.e. change channel), the following sequence of events takes place:

The current channel is viewed (step 1) until the viewer selects a new channel (step 2);

A black screen is viewed with silence for a very short duration just to notify the viewer that the current channel is being left and/or help the viewer to identify that a channel change is in progress (step 3);

Very shortly afterwards, a customized video sequence related to the new channel starts playing in full screen (step 4+5);

A key part of the customized video sequence—hereinafter called the "sting", which typically shows the identity/brand/sponsor of the new channel/show (or one or more advertisements/commercials), is played in its entirety (and is typically not interrupted by the end of the tuning if the end of tuning happens to occur in the meantime) (step 4);

Then a second part of the customized video sequence—hereinafter called the "segue", is played but can be interrupted at any time (step 5). The segue is either long enough to run throughout a long channel change/zapping sequence, or the segue can be played in loop (i.e. repetitively) until interrupted or the end of the zapping sequence occurs;

When the zapping sequence is finished (step 6), i.e. the video of the new selected channel is ready to be played, a transition is typically displayed between the segue and the new channel (step 7); and The new channel is then viewed full screen until the next channel change (step 8).

The system typically 'listens' for certain trigger points:
Selection of a new channel by the viewer;
The end of the "sting": this is typically signaled in metadata provided by the Television (TV) channels;
The end of the "zapping sequence", i.e. video of the new channel is available to be displayed; and
The end of the "segue", i.e. typically indicating that the segue should be repeated (replayed in a loop).

When a new channel selected by the viewer is known by the system, the appropriate customized video sequence is selected (according to criteria exposed by the channel in metadata, e.g. date, time, current program, genre of the current program, user profile, etc.).

Once the customized video sequence is ready to be played, it is typically only played after the maximum exposure time to the black screen has been reached. Exposure to the black screen adds artistic and psychological elements to the solution (e.g. the viewer may be expecting a black screen on channel change) and also allows time to select and acquire the appropriate customized video sequence and initiate the video player if necessary.

Once the customized video sequence is ready to be played and the exposure time to the black screen has expired, the customized video sequence is played until the key part—the "sting"—has finished playing, typically even if the tuning sequence (to the new channel) has already finished.

Figure 1:
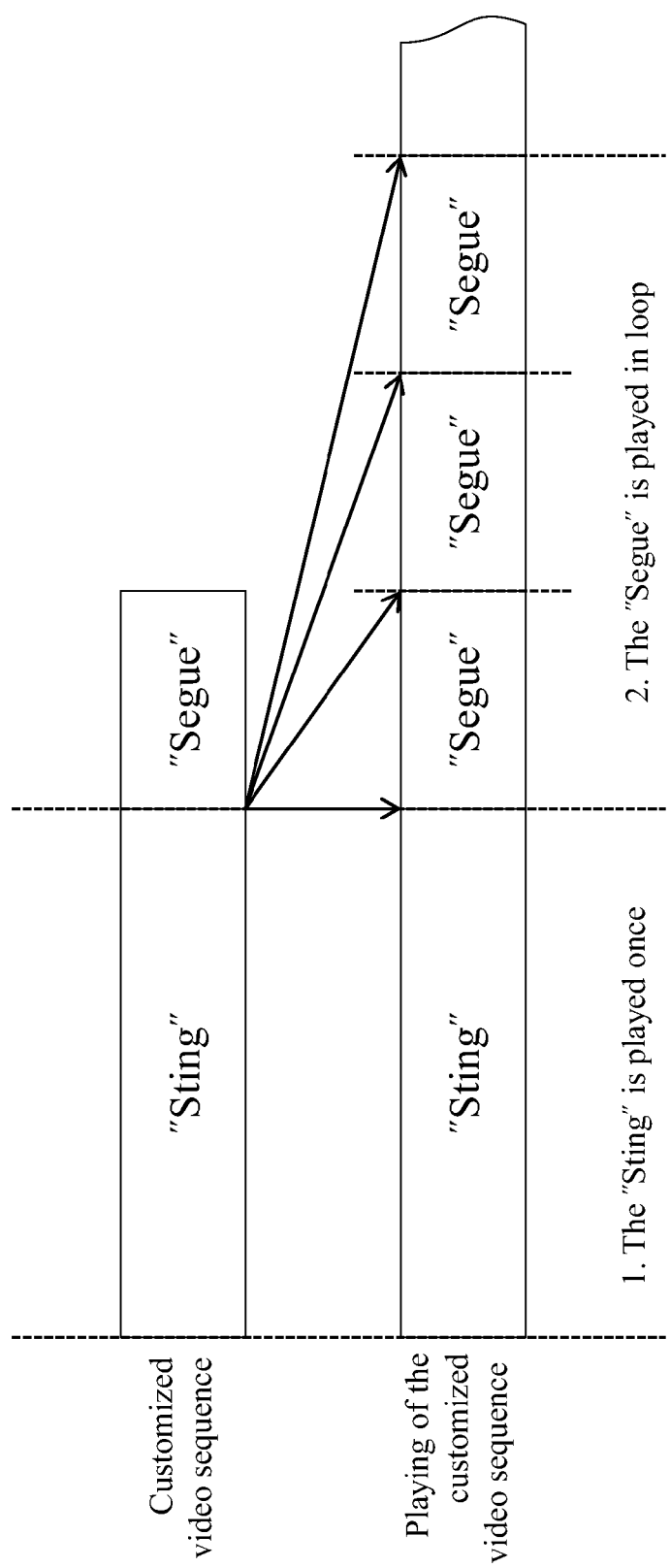
FIG. 1 illustrates a customized video sequence and how to play it beyond the end of the "Sting" according to embodiments of the present invention.

Once the end of the "sting"—defined in metadata—is reached, the player continues to play the segue portion of customized video sequence, potentially playing it repeatedly in a loop—from a point also defined in metadata. This is illustrated in FIG. 1.

While the "segue" is being played, and typically as soon as the zapping sequence is finished, the system implements a transition between the player that plays the "segue" and the player that plays the video of the new channel.

Figure 3:
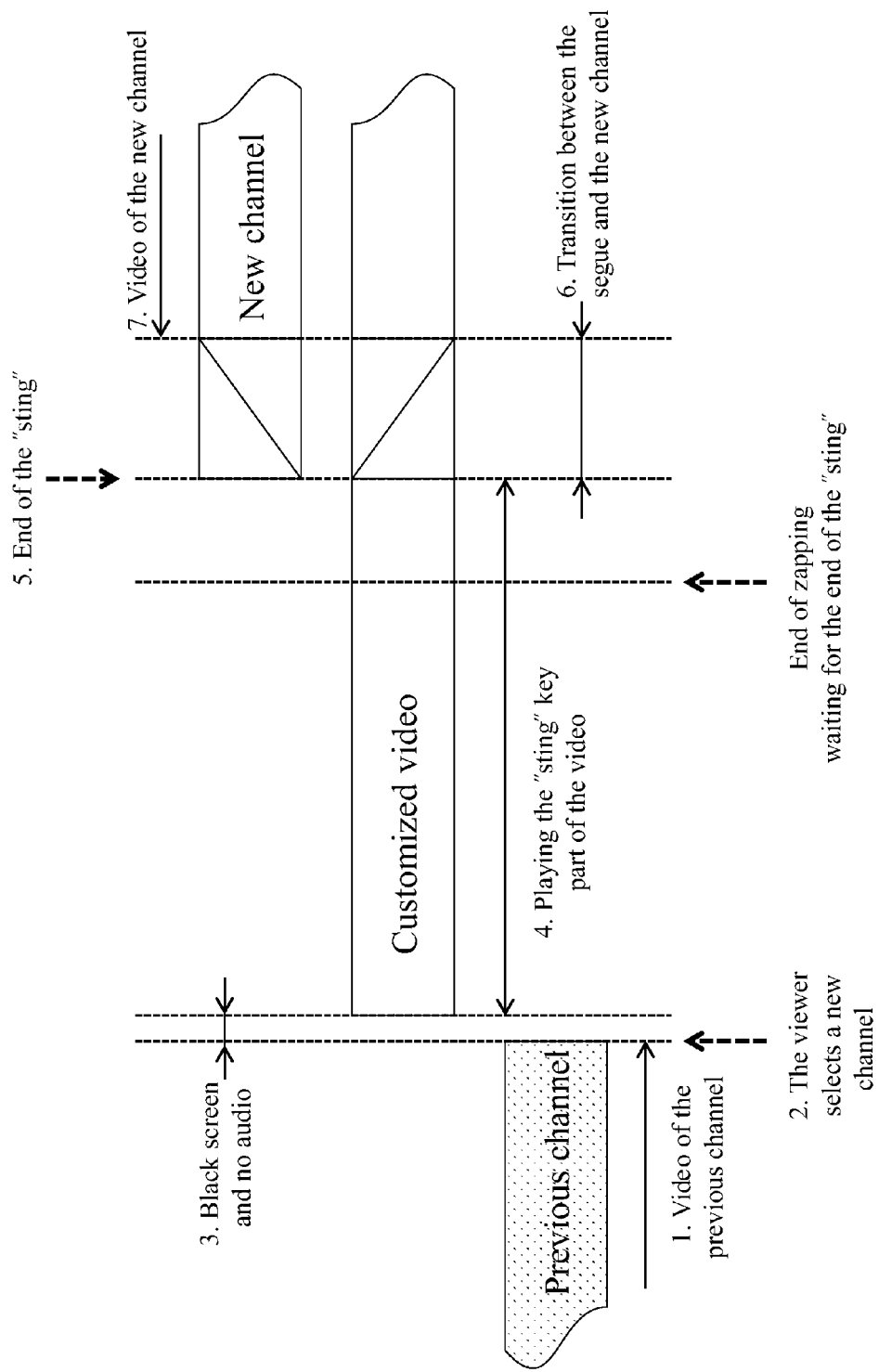
FIG. 3 illustrates a method of playing a customized video sequence during a channel change according to embodiments of the present invention.

It will be appreciated that the zapping sequence may finish before the end of the "sting". In such a case, the system typically waits for the end of the "sting" and then starts the "segue" in parallel to the transition to the video of the new channel which is already available. This is illustrated in FIG. 3.

At anytime, the selection of another channel by the user (for example the user presses a channel up/down button before the end of the zapping sequence) interrupts the sequence and starts a new one related to the new channel and starting again with a short black screen.

Optimization of Performance

Starting customized video sequences as fast as possible is desirable because display of the black screen is typically very short in order to act as a transition and not appear as a visible effect that would reproduce the frustration of the black screen with no audio.

Moreover, it's desirable for channels to be able to use all the duration of the zapping sequence to put their message across and not waste time between the beginning of the zapping sequence and the beginning of the customized video sequence that puts that message across.

Typically, it can take time to open the video file containing the customized video sequence to play and to initiate the player to reach a state where it is ready to start playing the sequence.

One solution, according to embodiments of the present invention, is to place all the customized video sequences that can be requested into the same video file.

Figure 4:
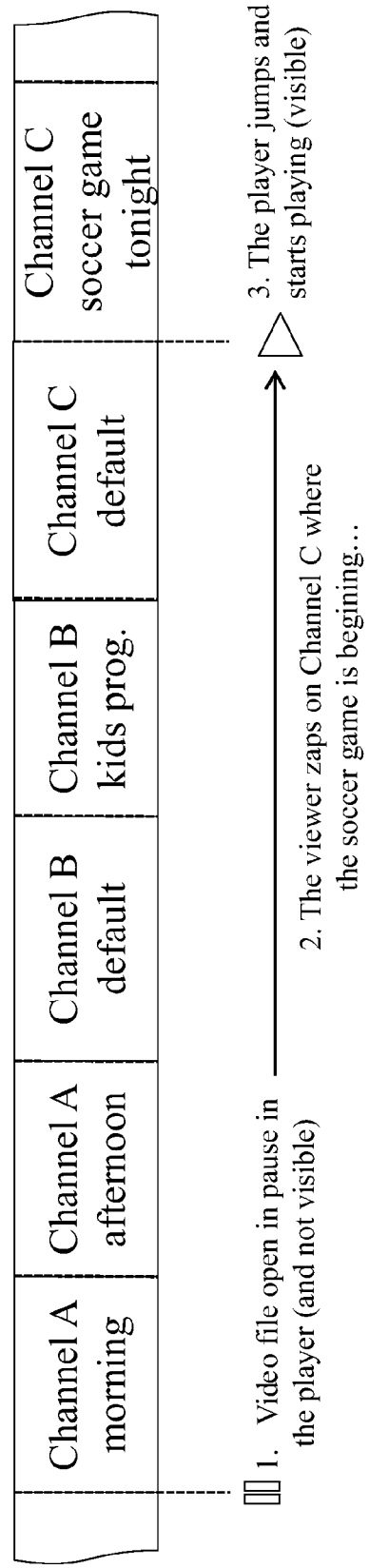
FIG. 4 illustrates a customized video sequence file according to embodiments of the present invention.

In any context where the feature of zapping with interstitial video is desirable, typically while watching TV on a regular channel, the file is opened once by the player which then switches to a pause mode, ready to jump to any pre-defined position and play from that position. This is illustrated as steps 1 to 3 in FIG. 4. Jumping from a state of pause at a previous position to a state of play at a pre-defined position is almost instantaneous.

In the context of embodiments of the present invention, the term "player" refers to a module operable to manage a video source and its on-screen display (OSD). As a module, it can use a decoding pipeline if it is free but it is not part of the decoding pipeline. This means that the system typically comprises several players and one decoding pipeline.

The metadata used in such an implementation is a table that specifies the relationship between references to the video sequences and related positions (e.g. time-codes) in the video file containing the sequences.

Consequently, metadata related to the end of the "sting", or the loop-point of the "segue" is relative and calculated by adding it to an offset defined by the starting point.

As seen previously, starting the customized video as fast as possible is desirable for both viewers and channel operators. But it is also desirable for the channel operator to have flexibility in updating the customized video sequences without having to upload all video sequences when only one video sequence is to be updated.

If all the customized video sequences are contained in only one file as suggested above, refreshing one video sequence only may lead to creating a new sequence file and uploading it in its entirety to the Digital Video Recorder (DVR).

Figure 5:
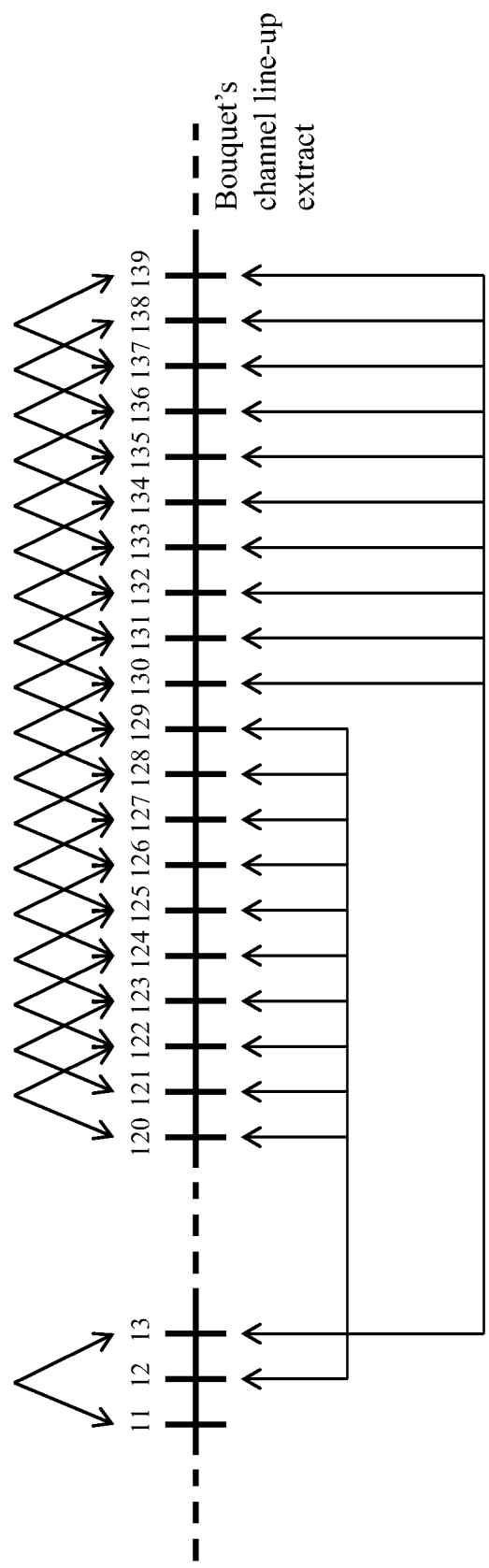
FIG. 5 illustrates the concept of a zapping area according to embodiments of the present invention.

A solution, according to embodiments of the present invention, to limit (as far as possible) the amount of content to be uploaded when updating the video sequences without limiting the performance achieved by having all the video sequences in a single video sequence file, is to gather video sequences in consistent groups where each group corresponds to a "zapping area" and is the object of one video file. A "zapping area" is a set of channels for which it is possible to anticipate that they can be the targets of a zapping in a particular and pre-identified context as illustrated in FIG. 5.

For example, if the viewer is watching channel N, channel N−1 and channel N+1 (i.e. adjacent channels) are available easily to the viewer through the use of the channel down and channel up button respectively and hence these channels are targets of zapping from channel N. Hence, for each channel it is possible to define a zapping area made up of the previous channel and the next channel and consequently a video sequence file can be created that contains all the customized video sequences related to these channels. Therefore, for each channel N, it is possible to create a video sequence file containing customized video sequences related to channels N−1 and N+1. Then, each time the viewer is watching a channel N, a player opens the file related to the target zapping area of this channel N, waiting in pause to jump and play the appropriate customized video sequence related to channel N−1 or channel N+1 if the viewer presses the channel down or channel up button.

Another way that a viewer can change channel is by using numbered remote control buttons to explicitly tap in the channel number of the desired channel.

For channels selected through tapping digits, there is typically a delay after each tap to allow the user time to tap another digit.

In the example that follows, it will be assumed that more than 99 channels are available to a viewer who therefore is given time to tap a 3 digit channel number. It will be apparent that someone skilled in the art can apply the teachings of what follows to a channel bouquet comprising 99 channels or less.

If the viewer only taps a single digit, the user typically then waits for the system to select the channel corresponding to the number. This delay gives the player time to open the video sequence file corresponding to a "zapping area" including this channel.

For example, if the user taps the digit "3" (to reach channel 3; or any of channels 30 to 39; or any of channels 300 to 399) the player selects the zapping area containing the channel 3 (the zapping area of, for example, channel 4, which contains channels 3 and 5 or the zapping area of channel 2, which contains channels 1 and 3) and opens the corresponding video sequence file.

If the user continues to wait (because the user is trying to select channel 3), then the player is ready to play the customized video sequence appropriate for channel 3.

If, however, the user taps a second digit before the end of the delay, the user:
  Either waits for the delay while the system selects the channel having the number made up of the two tapped digits;
  Or the user can select during this delay, by tapping a third digit, the channel having the number made up of these three digits.

After the user taps the second digit, the player opens a different specific "zapping area" sequence file containing the channel having the number made of the two first digits and the ten three digits channels having a number starting with these two first digits.

For example, after initially tapping the digit "3", the user taps the digit "6" (to reach channel 36; or any of channels 360 to 369). The player then selects the zapping area containing the channel 36 and channels 360 to 369. Hence, for each channel having two digits, it is possible to define a zapping area made up of the channel corresponding to the tapped two digits and of the ten channels of three digits having the same first two digits. Consequently a video sequence file can be created that contains all the customized video sequences related to these channels.

It is therefore possible to create one video sequence file for each channel having two digits that contains all the customized video sequences related to the two digit channel and all the customized video sequences related to the ten channels of three digits having the same two first digits. Then, each time the viewer taps two digits, a player opens the file related to the target zapping area, waiting in pause to jump and play the appropriate customized video sequence related to the channel corresponding to the two tapped digits if the viewer waits for the delay or to the channel corresponding to the three digits if the viewer taps a third digit. As there is no further delay after the user has entered a third digit, the customized video sequence is displayed quite quickly. The advantage of having the video sequence file opened is that it enables the player to jump and play the relevant customized video sequence immediately.

In order to update the video sequence file for a single channel means uploading:
  The two video sequence files related to zapping areas for P+/P− of the previous channel and the next channel; and
  The video file related to the zapping area for digit tapping containing the channel of two digits and the ten three digits channels having a number starting with the same two first digits.

Uploading these smaller video sequence files is typically faster than uploading a video sequence file that comprises all possible customized video sequences.

The principle of "zapping area" can be extended to any specific groups of channels for specific contexts, users or group of users to take into account. For example:
  Packs of subscriptions which define sub-channel-line-up for some groups of subscribers;
  List of favorite channels defined by the user;
  Sub-list of channels being the result of search, typically for a particular a genre; etc.

In the case where the user selects a channel for which the user is not authorized to view (e.g. because he does not have a subscription to that channel), the customized interstitial video sequence may be a specific video for promoting the channel and inviting the user to subscribe.

Audio Video (AV) Decoding

Embodiments of the present invention are typically implemented in PVR-STBs having a plurality of AV decoders. Having a plurality of AV decoders enables the system to perform several decoding operations in parallel. For instance, a first AV decoder receives and decodes for display a channel currently being watched by the user. Then, upon reception of a channel change request, the first AV decoder will tune to another stream to initiate connection with the newly selected channel. While this newly selected channel is being processed, a second AV decoder is able to decode for display one of the customized video sequences described above. When the newly selected channel is ready to be displayed then, the system switches back to the first decoder to decode for display of the newly selected channel.

In another embodiment of the present invention, the PVR-STB may comprise a single AV decoder. An AV decoder typically comprises an audio decoder and a video decoder. The AV decoder may also comprise an i-frame decoder that may be a subset of the video decoder or provided separately. The i-frame decoder is typically able to decode a single complete reference image such as an i-frame. In a case where the PVR-STB comprises a single AV decoder, it may be more complex and/or sometimes impossible to decode for display the customized video sequences during a zapping between the previously selected channel and the newly selected one. Indeed, when the user decides to zap to another channel (i.e. change channel), then the following sequence of events takes place at the AV decoder:
  Before receiving the user's input to change the channel, the AV decoder receives and decodes at real time speed the audio and video streams for display;
  At the time the user changes the channel:
  Current live channel tuning connection is torn down;
  New connection is initiated with the newly selected channel transponder settings; and
  Video decoder is then used to process the newly selected channel in order to identify the first i-frame for decoding and presentation on the display device.

The video decoder may therefore not be available for decoding the interstitial video, i.e. the customized video sequence relevant to the newly selected channel, while processing the newly selected channel.

In an embodiment of the present invention, the i-frame decoder is typically used to decode and play back the customized video sequences while the video decoder processes the newly selected channel. The system extracts the i-frames from the customized video sequences to form collections of i-frames that will be sent to the i-frame decoder. These collections of i-frames may also be stored on the storage device of the PVR-STB. Those skilled in the art will appreciate that the i-frames or reference frames suitable to be used by the i-frame decoder may also be retrieved or downloaded from external sources such as the Internet for example and stored on the PVR-STB as collections of reference frames. During the channel change, the collection of i-frames relevant to the newly selected channel is retrieved and sent to the i-frame decoder to be decoded and displayed on the display device. In parallel, the audio decoder and/or a Pulse-Code Modulation (PCM) player may be used to play the audio track of the customized video sequence relevant to the newly selected channel. Once the video decoder is ready, the newly selected channel is displayed. According to this embodiment of the present invention, the following sequence of events takes place when the user decides to zap to another channel:

- Tuning connection to the live channel currently being viewed is torn down;
- New connection is set up with the newly selected channel transponder settings;
- Video decoder is used to process the newly selected channel in order to identify the first i-frame for decoding and presentation while:
    - The collection of i-frames comprising sting and segue portions relevant to the newly selected channel is retrieved and played out as a sequence using the i-frame decoder and the audio clips are played out using the audio decoder or a PCM player;
    - If all the i-frames have been played out and the video decoder is not ready yet, then the i-frames corresponding to the segue portion are played out again by the i-frame decoder starting from the first i-frame of the segue portion; and
- Once the zapping sequence is finished (i.e. the video decoder is ready to display the newly selected channel), then the display switches back to the output of the AV decoder for displaying the newly selected channel.

In a further embodiment of the present invention, the AV decoder is typically used to decode and play back the customized video sequences. The received live content corresponding to the newly selected channel is buffered while the AV decoder decodes and plays back the customized video sequence relevant to the newly selected channel. Buffering the newly selected channel enables the AV decoder to start the decoding operation from the first available i-frame once the customized video has been played. Those skilled in the art will appreciate that, in this case, the newly selected channel decoded and displayed on the display device using this buffering technique may lag behind the actual broadcast.

Figure 6:
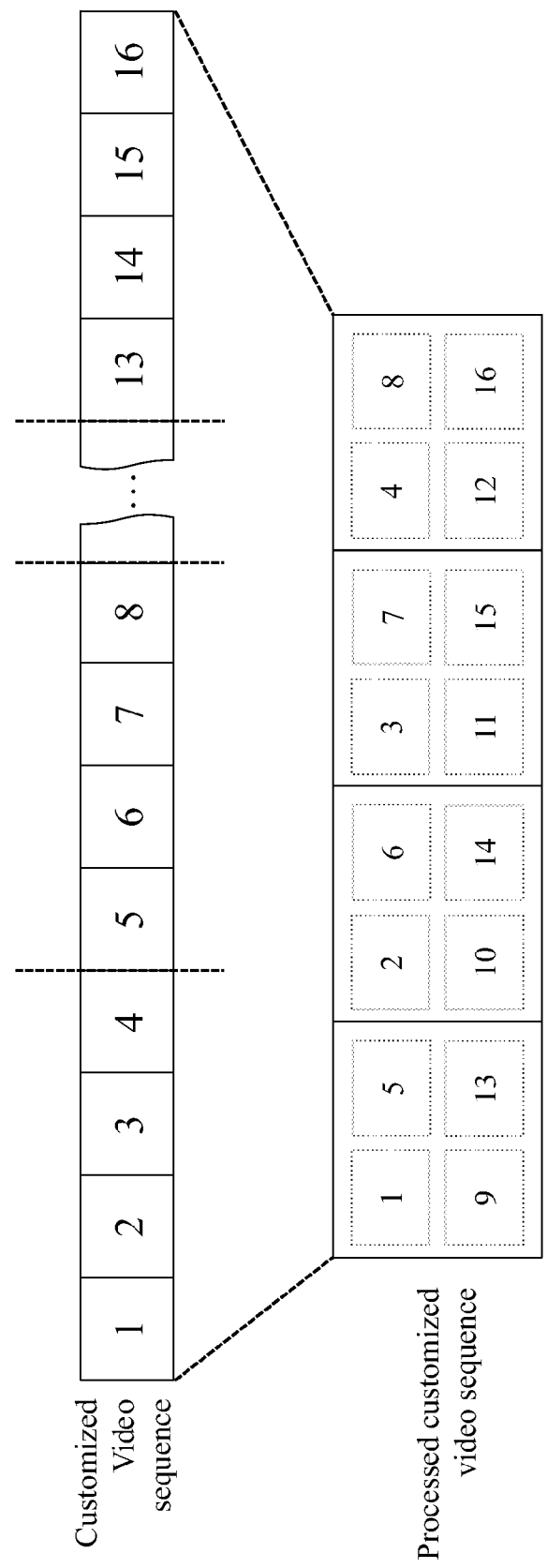
FIG. 6 illustrates a processed customized video sequence according to embodiments of the present invention.

Reference is now made to FIG. 6, which illustrates a processed customized video sequence according to embodiments of the present invention. The customized video sequence shown in FIG. 6 is typically played out during a zapping interval. FIG. 6 also illustrates a processed customized video sequence suitable to be used in single decoder PVR-STB. In the example illustrated in FIG. 6, each frame of the processed customized video sequence comprises a mosaic of, for example but without limiting the generality of the invention, four frames of the initial customized video sequence: the first frame 1 of the initial customized video sequence is downscaled and placed on the top left corner of the first frame of processed customized video sequence; the second frame 2 of the initial customized video sequence is downscaled and placed on the top left corner of the second frame of the processed customized video sequence; etc. Once the entire top left corner frames of the processed customized video sequence have been filled, then the next frame of the initial customized video sequence is downscaled and placed on the top right corner of the first frame of the processed customized sequence. Then, the frames of the initial customized video sequence are downscaled and placed on the bottom left corner and the bottom right corner of the processed customized video sequence, the last frame 16 of the initial customized video sequence being downscaled and placed on the bottom right corner of the last frame of the processed customized video sequence. Those skilled in the art will appreciate that different mosaic arrangements may be used to create the processed customized video sequence. Hence, each frame of the processed customized video sequence is a mosaic containing a plurality of sub-frames, the sub-frames corresponding to the frames extracted from the initial customized video sequence and downscaled. The sub-frames corresponding to the beginnings and the ends of the sting and segue portions may also be marked in the processed customized video sequence thereby easing playback of the file during a zapping sequence, especially when the segue portion is played repeatedly. Those skilled in the art will appreciate that another sub-frame of the segue portion may be marked and the segue portion may be therefore played out again from this marked sub-frame. One advantage of creating such a processed customized video sequence is that the decoding operation takes less time. Therefore, it is possible for single AV decoder PVR-STBs to decode and store the processed customized video sequence in a buffer while a first portion is played out. Then, a second portion of the processed customized video sequence is played out from the buffer and the AV decoder is available to process the new channel selected by the user. In such an implementation, playing out the processed customized video sequence is achieved by upscaling the relevant sub-frame for display in full screen. The video player starts upscaling the sub-frame located on the top left corner of the first frame of the processed customized video sequence, then the sub-frame located on the top left corner of the second frame of the processed customized video sequence, etc. Those skilled in the art will appreciate that any sub-frame arrangement of the processed customized video sequence may be suitable as long as the video player is informed of which sub-frame to upscale for display.

Figure 7:
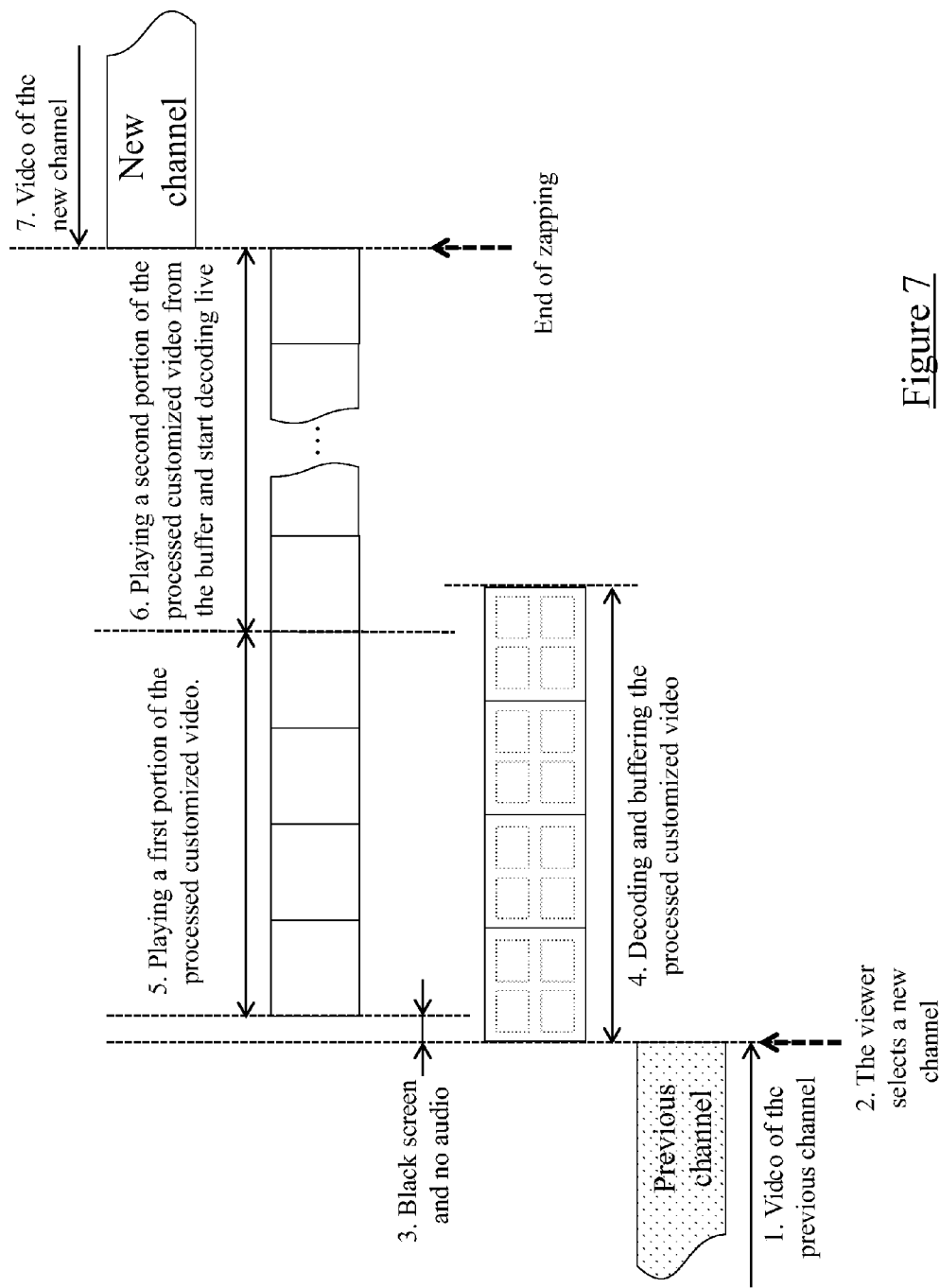
FIG. 7 illustrates a method of playing a processed customized video sequence during a channel change according to embodiments of the present invention.

Reference is now made to FIG. 7, which is an illustration of a method of playing a processed customized video sequence during a channel change according to embodiments of the present invention. In this alternative embodiment, the PVR-STB comprises a single decoder and uses the processed customized video sequence described hereinabove. Therefore, the following sequence of events takes place when the user decides to zap to another channel:

- Tuning connection to the live channel currently being viewed is torn down;
- The AV decoder starts decoding the processed customized video sequence and the video player starts playing out a first portion of the decoded processed customized video sequence by upscaling the relevant sub-frames for display in full screen;
- The decoded processed customized video sequence is also stored in a buffer;
- Once a first portion has been played out and the processed customized video sequence is decoded entirely, then a new connection is set up with the newly selected channel transponder settings and the AV decoder processes the newly selected channel in order to identify the first i-frame for decoding and presentation;

Then, a second portion of the processed customized video sequence is played out by the video player using the decoded processed customized video sequence stored in the buffer. This second portion can therefore be played out from the buffer by upscaling the relevant sub-frame of the processed customized video sequence for display in full screen; and Once the zapping sequence is finished (i.e. the AV decoder is ready to display the newly selected channel), then the newly selected channel is displayed on the display device.

The first portion of the processed customized video sequence played out by the AV decoder by upscaling the relevant sub-frames for display in full screen may correspond to the sting portion. In such a case, the second portion played out from the buffer may be the segue portion and therefore may be played out repeatedly. However, those skilled in the art will appreciate that the first and second portions may be any suitable portions of the processed customized video sequence as long as the sub-frames corresponding to the beginnings and the ends of the sting and segue portions are marked and/or the sub-frame corresponding to the point from where the segue portion has to be played out repeatedly is marked.

Embodiments of the present invention describe the insertion of short customized video sequences while zapping between channels for:

improving the user perception of tuning (i.e. channel change) duration;

breaking the frustration of switching the audio and video off and then back on again during channel change;

reinforcing the brand of the channel and its relationship with the viewer; and exposing sponsorship and/or advertising.

Channels typically provide the operator with the short customized video sequence (to be displayed during zapping) together with criteria for selection and specific metadata. The operator then typically uploads the video sequences, criteria and metadata to a subscriber's PVR-STB (Personal Video Recorder-Set-Top-Box), typically over an Internet connection (e.g. broadband, WiFi, etc.) or via a broadcast communications channel.

When the viewer selects a new channel on the PVR-STB, the system selects the customized video sequence that is to be inserted during the tuning process by following the criteria provided by the channel (date, time, current program, genre of the current program, user profile, etc.)

Then the customized video sequence is played respecting a template of narration including:

Short black-screen;

Key part of the selected video sequence; and

Transition part of the selected video sequence where the transition with the new channel happens.

All the steps of this template are driven by triggers provided by the system and new specific metadata:

The user selects a new channel;

The end of the key part of the video sequence is reached; and

The tuning process is finished (new channel is available for display).

The performance of starting selected video sequences is optimized by having already open in a player the video file containing the selected customized video sequences, and being ready to jump and play from the appropriate position in the file.

Updating a maximum number of video sequences by uploading a minimum amount of content is optimized by gathering video sequences in files according to an anticipation of the potential next channels from any current channel.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for displaying a customized video sequence during a channel change interval, said method comprising:
  displaying a first channel;
  receiving a channel change request from a user requesting a second channel for display;
  displaying a video sequence during said channel change interval; and
  displaying a second channel;
  wherein, said displaying a video sequence during said channel change interval further comprises: displaying a black screen with no audio and no video for a short duration; playing out a first video portion of a customized video sequence relevant to said second channel until an end point signaled in metadata provided by a television operator; playing out a second video portion of said customized video sequence relevant to said second channel until said second channel is ready to be displayed; and repetitively playing out said second video portion when an end point of said second video portion signaled in said metadata is reached and until said second channel is ready to be displayed.

2. The method of claim 1, wherein said playing out said second video portion is interrupted when said second channel is ready to be displayed.

3. The method of claim 1, said method further comprising:
  storing a plurality of customized video sequences, said plurality of customized video sequences being relevant to a plurality of channels; and
  identifying a customized video sequence relevant to a second channel requested by a user from said plurality of customized video sequences, said relevant customized video sequence being displayed as said video sequence.

4. The method of claim 3, wherein said storing a plurality of customized video sequences comprises storing said customized video sequences in a single video file.

5. The method of claim 4, wherein said storing said customized video sequences in a single video file further comprises opening and placing said video file in a pause mode until a customized video sequence relevant to said second channel is identified for being played out.

6. The method of claim 3, wherein said storing a plurality of customized video sequences comprises storing said customized video sequences in a plurality of video files.

7. The method of claim 6, wherein said storing said customized video sequences in a plurality of video files comprises storing a set of customized video sequences relevant to one channel in a separate video file.

8. The method of claim 7, wherein said storing said set of customized video sequences relevant to one channel in a separate file comprises storing customized video sequences of channels adjacent to said one channel.

9. The method of claim 6, wherein said storing said customized video sequences in a plurality of video files comprises storing a set of customized video sequences relevant to a specific group of channels in a separate video file, said specific group of channels including:
- one channel and channels having a same two first digits as said one channel; or
- channels included in a specific subscription pack; or
- channels marked as favorite channels by a user; or
- channels obtained as results of a search performed by a user.

10. The method of claim 3, wherein said identifying said customized video sequence relevant to a second channel requested by a user comprises using metadata provided by television operators.

11. The method of claim 3, wherein said method further comprises processing a plurality of customized video sequences to create a plurality of new customized video sequences, said plurality of new customized video sequences being relevant to a plurality of channels.

12. The method of claim 11, wherein said processing said plurality of customized video sequences comprises retrieving relevant frames for said customized video sequences from external sources.

13. The method of claim 11, wherein said processing said plurality of customized video sequences comprises extracting relevant frames from said customized video sequences.

14. The method of claim 13, wherein said extracting relevant frames from said customized video sequences comprises extracting i-frames from said customized video sequences.

15. The method of claim 11, said method further comprising: playing out said processed customized video sequences as sequences using an i-frame decoder while decoding a second channel requested by a user.

16. The method of claim 11, wherein said processing said plurality of customized video sequences to create said plurality of new customized video sequences comprises creating new frames, each of said new frames containing a mosaic of relevant frames extracted from said customized video sequences.

17. The method of claim 11, said method further comprising:
- decoding and storing a new customized video sequence;
- playing out a first video portion of said new customized video sequence upon decoding of said first video portion and until an end point of said first video portion signaled in metadata provided by a television operator;
- playing out a second video portion of said new customized video sequence until a second channel requested by a user is ready to be displayed; and
- repetitively playing out said second video portion when an end point of said second video portion signaled in said metadata is reached and until said second channel is ready to be displayed;
- wherein said playing out said second video portion and said repetitively playing out said second video portion are achieved using said stored new customized video sequence.

18. The method of claim 17, wherein said playing out said first and second video portions of said new customized video sequence comprises upscaling a relevant frame of said mosaic of relevant frames for display in full screen.

19. Apparatus for displaying a customized video sequence during a channel change interval, said device comprising:
- means for displaying a first channel, a video sequence during said channel change interval and a second channel;
- means for receiving a channel change request from a user requesting a second channel for display;
- wherein said means for displaying a video sequence during said channel change interval is further for displaying a black screen with no audio and no video for a short duration; for playing out a first video portion of a customized video sequence relevant to said second channel until an end point of said first video portion signaled in metadata provided by a television operator; for playing out a second video portion of said customized video sequence relevant to said second channel until said second channel is ready to be displayed; and for repetitively playing out said second video portion when an end point of said second video portion signaled in said metadata is reached and until said second channel is ready to be displayed.

20. A receiving device operable to display a customized video sequence during a channel change interval, said device comprising:
- a display device operable to display a first channel, a video sequence during said channel change interval and a second channel;
- a receiver operable to receive a channel change request from a user requesting a second channel for display;
- wherein said display device operable to display a video sequence during said channel change interval is further operable to display a black screen with no audio and no video for a short duration; to play out a first video portion of a customized video sequence relevant to said second channel until an end point of said first video portion signaled in metadata provided by a television operator; to play out a second video portion of said customized video sequence relevant to said second channel until said second channel is ready to be displayed; and to repetitively play out said second video portion when an end point of said second video portion signaled in said metadata is reached and until said second channel is ready to be displayed.

* * * * *